United States Patent [19]

Higashi et al.

[11] Patent Number: 4,511,642

[45] Date of Patent: Apr. 16, 1985

[54] PHOTO-FIXING HEAT-SENSITIVE RECORDING MEDIA WITH PHOTOSENSITIVE DIAZONIUM SALT, COUPLER, AND ORGANIC BORON SALT

[75] Inventors: Kensaku Higashi; Haruhiko Yano, both of Shizuoka; Hirotsugu Sato; Ken Sukegawa, both of Tokaimura; Yuji Ooba, Yokosuka, all of Japan

[73] Assignees: Nippon Telegraph and Telephone Public Corp.; Tomoegawa Paper Manufacturing Co., Ltd., both of Tokyo, Japan

[21] Appl. No.: 465,084

[22] Filed: Feb. 9, 1983

[30] Foreign Application Priority Data

| | | | |
|---|---|---|---|
| Feb. 17, 1982 | [JP] | Japan | 57-22893 |
| Feb. 17, 1982 | [JP] | Japan | 57-22894 |
| Apr. 16, 1982 | [JP] | Japan | 57-62478 |
| Jun. 7, 1982 | [JP] | Japan | 57-96175 |

[51] Int. Cl.$^3$ ........................ G03C 1/60; G01D 15/10

[52] U.S. Cl. .................................... 430/161; 430/151; 430/162; 430/168; 430/169; 430/176; 430/177; 430/178; 430/180; 346/76 PH; 346/135.1; 428/199; 428/206; 428/207; 428/913

[58] Field of Search ............... 430/151, 168, 169, 176, 430/177, 180, 181, 182, 178, 161, 162; 250/316.1, 317.1; 346/76 PH, 135.1; 428/199, 206, 207, 913

[56] References Cited

U.S. PATENT DOCUMENTS

| | | | |
|---|---|---|---|
| 3,155,513 | 11/1964 | Sorensen . | |
| 3,202,510 | 8/1965 | Hollmann . | |
| 3,312,551 | 4/1967 | Sus | 430/151 |
| 3,353,984 | 11/1967 | Landau | 430/168 |
| 3,367,776 | 2/1968 | Bialczak et al. | 430/180 |
| 3,416,924 | 12/1968 | Tummers . | |
| 3,539,345 | 11/1970 | Welch | 430/151 |
| 3,567,453 | 3/1971 | Borden . | |
| 3,642,483 | 2/1972 | Kubo et al. | 430/178 |
| 4,387,150 | 6/1983 | Yabuta et al. . | |
| 4,400,456 | 8/1983 | Matsuda et al. | 430/151 |
| 4,411,979 | 10/1983 | Nagamoto et al. | 430/151 |

FOREIGN PATENT DOCUMENTS

| | | | |
|---|---|---|---|
| 149717 | 7/1981 | German Democratic Rep. | 430/151 |

OTHER PUBLICATIONS

Kosar, J., "Light-Sensitive Systems", J. Wiley & Sons, 1965, p. 219.

*Primary Examiner*—Charles L. Bowers, Jr.

[57] ABSTRACT

Photo-fixing heat-sensitive recording media which comprise diazonium salts, couplers and/or basic materials, all of these components being insoluble or sparingly soluble in water. At least one of these components is present in the media in the form of a fine powder. The coupler may be a coupler which has a basic group therein and serves as both a coupler and a basic material.

2 Claims, No Drawings

PHOTO-FIXING HEAT-SENSITIVE RECORDING MEDIA WITH PHOTOSENSITIVE DIAZONIUM SALT, COUPLER, AND ORGANIC BORON SALT

BACKGROUND OF THE INVENTION

1. Field of the Invention

This invention relates to the recording art and more particularly, to photo-fixing heat-sensitive recording media of the type in which information is recorded by application of heat and are fixed by irradiation of light and in which thermal recording of high sensitivity is possible with excellent storage stability.

2. Description of the Prior Art

Heat-sensitive recording systems have widely been used such as in facsimiles or printers in recent years because of the advantages that the apparatus can be made compact and light in weight and that recording is effected noiselessly. Known heat-sensitive recording papers can broadly be classified into two categories, one category including a heat-sensitive recording paper which makes use of so-called metal chelating based on the reaction between a metal salt of an organic acid and a reducing agent, the other category including a recording paper which utilizes color formation by dye based on the reaction between electron donative and acceptive materials. However, these recording papers involve the problems that color is undesirably formed or disappears upon re-heating or upon application of organic solvents, or on contact with adhesives or cellophane tapes. In order to overcome the above problems, an attempt has been made to make a heat-sensitive paper utilizing a thermally developing diazo system. In this system, diazonium salts and couplers are thermally reacted in an imagewise pattern to record the information pattern by formation of azo dye. Subsequent light irradiation causes the diazonium salt in non-recorded areas to be photodecomposed and fixed. Thus, the order of the heating and the exposure to light in this system is contrary to that of ordinary thermal developing diazo systems. This in turn requires much higher heat sensitivity than in ordinary thermal developing diazo systems because application of heat by thermal heads must be within a very short time duration, say, several microseconds.

A number of heat-developing diazo systems have been hitherto proposed. For instance, in known thermally developing diazo systems, most of diazonium salts, couplers and basic materials are soluble in water and these materials are, in most cases, applied onto substrate as solutions. Accordingly, pre-coupling reactions and the like often occur during storage and the media using these materials are very poor in storage stability especially under high humidity. In order to overcome the above drawback, there was proposed a multi-layer heat-sensitive recording medium in which at least one component of diazonium salts, couplers and basic materials was separated by a partition layer made of waxes or polymeric materials. Also, a single layer recording medium was proposed in which the at least one component was isolated by microcapsulating techniques. However, these known media have the drawback that the recording media or layers tend gradually towards the basic range not only at the time of heating but also even under room temperature conditions, causing pre-coupling. In addition, a great amount of heat energy is necessary for color development of formation. Thus, up to this time no systems have been made systems which have such a high level of heat sensitivity as to allow recording by thermal heads and satisfactory storage stability. In the prior art, the prevention of pre-coupling and the improvement of storage stability are attained only with a substantial sacrifice of heat sensitivity. Accordingly, the improvement of heat sensitivity results in lowering of storage stability.

SUMMARY OF THE INVENTION

It is therefore an object of the present invention to provide photo-fixing heat-sensitive recording media comprising diazonium salts which overcome the drawbacks of the prior art.

It is another object of the invention to provide photo-fixing heat-sensitive recording media which have both high heat sensitivity and satisfactory storage stability.

In accordance with the present invention, there are provided photo-fixing heat-sensitive recording media which comprise a substrate and a coating of a recording composition formed on the substrate, the composition comprising at least one diazonium salt, at least one coupler and optionally, at least one basic material, all of which are insoluble or sparingly soluble in water, at least one component being present in the form of a fine powder. If couplers of the type which have a basic group therein and serving also as a basic material are used, different basic materials are not necessarily required. In order to further improve the storage stability, the composition may further comprise an agent capable of rendering diazonium salts insoluble or sparingly soluble in water.

As discussed hereinbefore, in known thermally developing diazo systems, most of diazonium salts, couplers and basic materials are soluble in water, so that pre-coupling reactions and the like often occur during storage and the media using these materials are very poor in storage stability especially under high humidity conditions. In the practice of the invention, all the components such as diazonium salts, couplers and optionally, basic materials, or diazonium salts and couplers having basic functional groups therein should be insoluble or sparingly soluble in water and at least one component should be present in the form of a fine powder with a certain size. By this, the media using these components become excellent in storage stability even under high humidity conditions. This storage stability is further improved when an agent capable of rendering diazonium salts insoluble or sparingly soluble in water is added.

As for color formation by heating, a high level of heat sensitivity is ensured when the individual components are uniformly mixed with one another in the coating.

DETAILED DESCRIPTION OF THE INVENTION

The components used in the practice of the invention are illustrated below.

The water-insoluble or water-sparingly-soluble diazonium salts used in the present invention can be obtained by replacing anionic components of known diazonium salts by specific types of anions. All known diazonium cations are usable in the practice of the invention and include, for example, p-N,N-dimethylaminobenzenediazomium, p-N,N-diethylaminobenzenediazonium, p-N-ethyl-N-B-hydroxyethylaminobenzenediazonium, p-N-diethylamino-O-ethoxybenzenediazonium, 4-diethylamino-3-(4′-chlorophenoxy)-

6-chlorobenzenediazonium, p-N-benzyl-N-ethylbenzenediazonium, p-N-phenylaminobenzenediazonium, p-N,N-diethylamino-m-methylbenzenediazonium, 4-morpholinobenzenediazonium, 4-morpholino-2,5-dimethoxybenzenediazonium, 4-morpholino-2,5-dithoxybenzenediazonium, 4-morpholino-2,5-dibutoxybenzenediazonium, 4-pyrrolidino-3-methylbenzenediazonium, 4-benzamido-2,5-dimethoxybenzenediazonium, 4-benzamido-2,5-diethoxybenzenediazonium, 4-(4'-methoxy)benzamido-2,5-diethoxybenzenediazonium, 4-(4'-tolyl)mercapto-2,5-diethoxybenzenediazonium. When these cations are combined with the following anions, the resulting diazonium salts are imparted with insolubility or sparing solubility in water. Examples of the anions are $BF_4^-$, $TiF_6^{2-}$, $SnF_6^{2-}$, $ZnF_4^{2-}$, $PF_6^-$, $SCN^-$, phosphowolframate ions, phosphomolybdate ions, silicowolframate ions, arylsulfonate ions, organic boron ions and the like. Of these, preferable anions are organic boron ions, $PF_6^-$ and arylsulfonate ions.

The organic boron ions are those represented by the following general formula

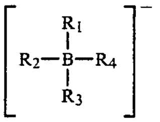

in which $R_1$–$R_4$ independently represent an alkyl group, an alkenyl group, a cycloalkyl group, an allyl group, an aryl group, a heterocyclic group or a cyano group.

Examples of the organic boron ions are shown below.

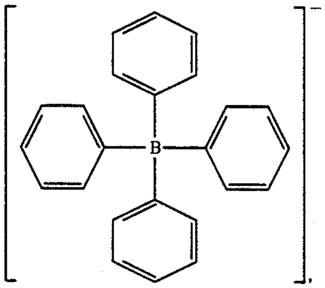

,

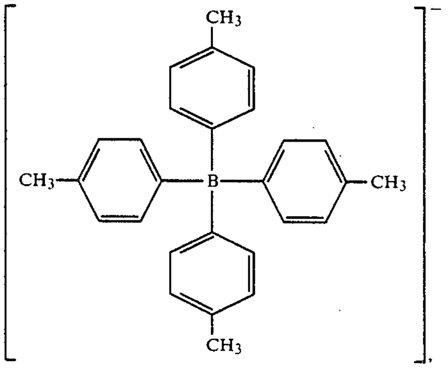

,

-continued

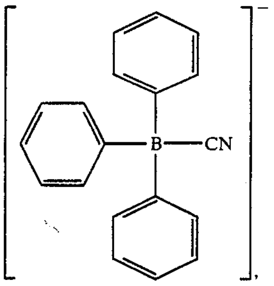

,

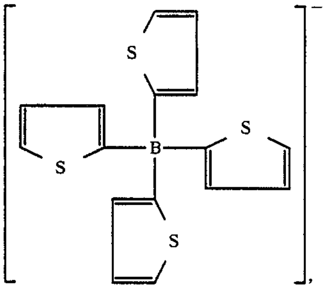

,

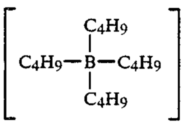

and

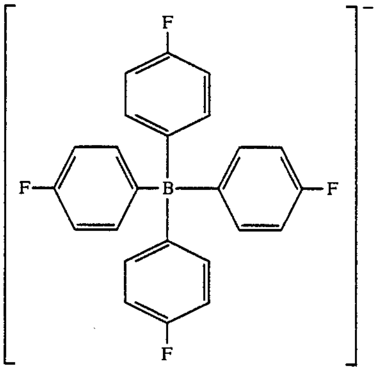

Examples of the arylsulfonate ions are anions of 1-naphthol-4-sulfonate, 1-naphthol-5-sulfonate, 2,3-dihydroxynaphthalene-6-sulfonate, 1-naphthalenesulfonate, 2-naphthol-6-sulfonate, 2-naphthol-4-sulfonate, naphthalene-1,5-disulfonate, naphthalene-2,7-disulfonate, 2-naphthol-3,6-disulfonate, 2-naphthol-6,8-disulfonate, 2,7-dihydroxynaphthalene-3,6-disulfonate, 1,8-dihydroxynaphthalene-3,6-disulfonate, 2-hydroxy-4-methoxybenzophenone-5-sulfonate, 2-methoxy-4-octoxybenzophenone-5-sulfonate and the like provided that the disulfonates may have one cation such as hydrogen, sodium or potassium. Of these, preferable arylsulfonates are those represented by the following formulae:

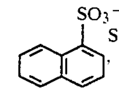, 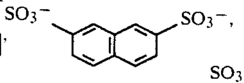, 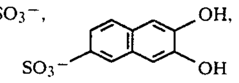,

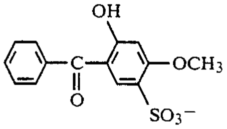 and 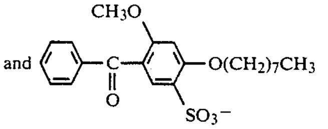

It will be noted here that all the arylsulfonates which have both —OH and —$SO_3$ groups at the benzene or naphthalene ring such as 2,3-dihydroxynaphthalene-6-sulfonate also serve as a coupler. In general, when a counter anion in the diazoarylsulfonates has at least one hydroxyl group directly joined to the benzene ring, the counter anion itself has the coupling ability with a diazonium salt. Accordingly, this type of diazonium compounds can develop color by addition of a basic material alone without use of any couplers. In this sense, the diazonium salts having, for example, 2,3-dihydroxynaphthalene-6-sulfonate anion therein are advantageous because of their self color formation.

The insoluble or sparingly soluble diazonium salts used in the present invention are synthesized in the following manner. That is, an aqueous solution of any known water-soluble diazonium salt, e.g. p-N,N-dimethylaminobenzenediazonium chloride zinc chloride double salt, is mixed under agitation with an aqueous solution of a compound capable of releasing such a specific anion as indicated above in water, e.g. an aqueous solution of $KPF_6$. The resulting precipitate in the aqueous solution is an intended water-insoluble or water-sparingly-soluble diazonium salt, which is collected by filtration.

The couplers useful for the purpose of the invention are all the known couplers which are insoluble or sparingly soluble in water. For instance, o-hydroxydiphenyl, 1-hydroxynaphthalene, 2-hydroxynaphthalene, 2,7-dihydroxynaphthalene, 2-hydroxy-3-naphthoic acid derivatives such as naphthol AS, AS—D, AS—BO, AS—BS, AS—OL, AS—SW, AS—MX, AS—PH, AS—RL, AS—E, AS—AN, AS—TR and the like.

The basic materials used in the present invention are those which are able to melt, dissolve, decompose and react upon heating to make a basic atmosphere suitable for the coupling reaction between the diazonium salt and the coupler and which are insoluble or sparingly soluble in water. For example, there can be mentioned organic amines such as distearylamine, nitrogen-containing heterocyclic compounds such as 2-phenylimidazole.

Couplers having basic groups are substances serving as both couplers and basic materials and should be insoluble or sparingly soluble in water. Suitable basic couplers are those represented by the following formula

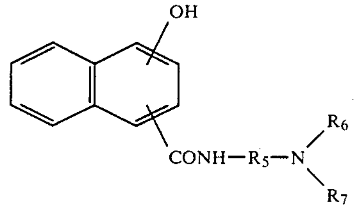

in which $R_5$ are represents an alkyl group having 1 to 18 carbon atoms, and $R_6$ and $R_7$ independently represent hydrogen or an alkyl group having 1 to 18 carbon atoms or may form a heterocyclic ring along with N atom.

Examples of the basic couplers are shown below.

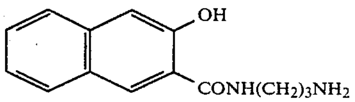

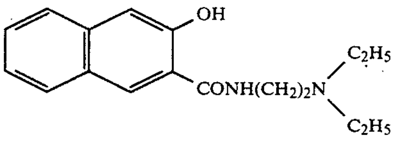

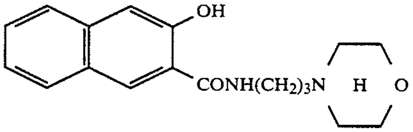

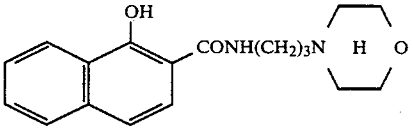

The insolubilizing or sparingly solubilizing agents for diazonium salts are materials which can release such anions as mentioned hereinbefore with regard to the diazonium salts when placed in an aqueous solution. The agents include, for example, $HPF_6$, $HBF_4$, $H_2TiF_6$, $H_2SnF_6$, $H_2ZnF_4$, organic boron salts, arylsulfonic acid, phosphowolframic acid, phosphomolybdeic acid, silicowolframic acid, thiocyanic acid and salts thereof.

Preferable insolubilizing or sparingly solubilizing agents of the inventions are organic boron salts represented by the following general formula same as the formula described with reference to the diazonium salts

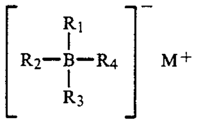

in which $R_1$-$R_4$ independently represent an alkyl group, an alkenyl group, a cycloalkyl group, an allyl group, an aryl group, a heterocyclic group or a cyano group, and $M^+$ reprsents an alkali metal ion.

Examples of these agents are shown below.

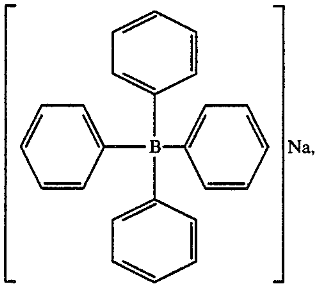

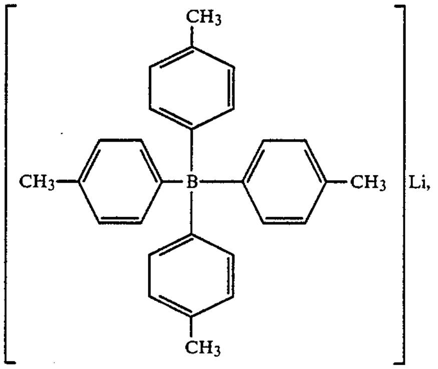

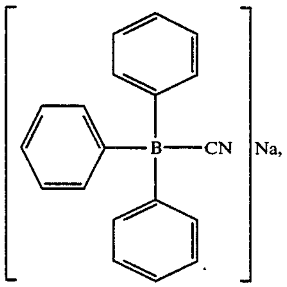

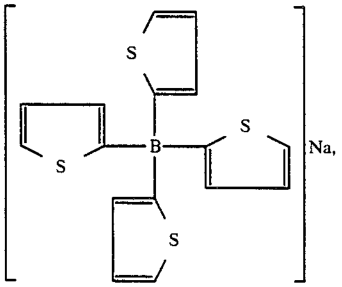

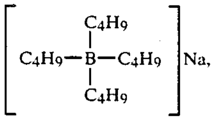

-continued

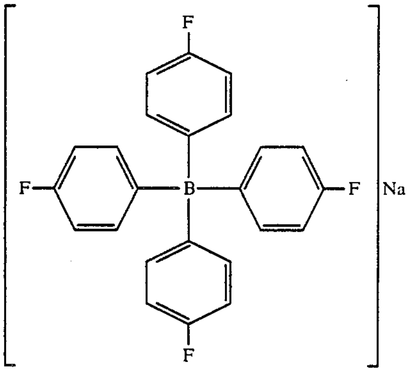

Typical manners of application of these agents are as follows.

(1) The agent is contained in a layer comprising a diazonium salt and/or in a layer comprising a coupler.

(2) The agent is contained in a layer which comprises a diazonium salt and a coupler.

(3) The agent is contained in a layer partition between a layer comprising a diazonium salt and a layer comprising a coupler.

The diazonium salts, couplers, basic materials, basic group-bearing couplers and insolubilizing or sparingly solubilizing agents for diazonium salts may be used singly or in combination of two or more, respectively.

Moreover, the insolubilizing or sparingly solubilizing agent for diazonium salts is suitably used in an amount of 0.1 to 1000 parts by weight per 100 parts by weight of a diazonium salt.

The ingredients discussed above are usually used in combination with binders when applied to substrates. Any known binders used for this purpose are usable in the practice of the invention and include, for example, water-soluble binders such as polyvinyl alcohol, starch, salts of isobutylene-maleic anhydride copolymer and the like, emulsions such as of polyvinyl acetate, styrene-butadiene copolymer and the like, various resins such as nitro cellulose, polyvinyl acetate, polyvinyl chloride, polyesters, polyvinyl butyral and the like.

Aside from the ingredients described hereinabove, pigments such as silica, alminium hydroxide, calcium carbonate and the like, antioxidants such as thiourea, ascorbic acid and the like, various waxes serving as an improver for heat sensitivity and color density may be used.

The substrate used in the present invention are high quality papers, coated papers, art papers, synthetic resin films, non-woven fabric sheets, metal sheets, glass plates and the like.

Preparation of the photo-fixing heat-sensitive recording media of the invention are illustrated below.

The diazonium salts, couplers, basic materials and couplers having basic groups are dispersed in water, or are dissolved in organic solvents such as alcohols, acetone, MEK, ethyl acetate and the like singly or in combinations of two or more. All of these materials which are insoluble or sparingly soluble in water are finely powdered to have sizes ranging from 0.01 to 10 microns when dispersed. If two or three components are used, at least one component should be dispersed in water while the other may be dissolved in organic solvents by which the medium having improved storage stability can be obtained. The dispersion is carried out in various apparatus such as a ball mill and, if necessary, dispersants may be used for the dispersion. The insolubilizing or sparingly solubilizing agents for diazonium salts, binders, pigments and various additives may be added prior to or after the dispersion or dissolution. The dispersions or solutions are appropriately mixed with one another, to which binders and other additives are added, if necessary. The mixture is then coated on or impregnated in a substrate by any suitable methods thereby obtaining photo-fixing heat-sensitive media. Where all the components are dispersed, the coating is usally made of one or two layers. If there is a component which is dissolved, not dispersed, the coating should be made of at least two layers including a dissolved-component layer and a layer obtained from the dispersion. When two or more layers are formed on a substrate, care should be taken to the order of application, choice of solvent and manner of applications so that a subsequent coating does not dissolve out the component in the previously formed layer to cause pre-coupling.

Examples are shown below to illustrate fabrication of the photo-fixing heat-sensitive recording media of the invention.

EXAMPLE 1

A paint of the following composition was prepared and applied on a high quality paper with a weight basis of 64 g/m$^2$ by means of a wire bar and dried at 80° C. The amount of a paint was 3.5 g/m$^2$ on the dry basis.

- Aqueous dispersion of 20% 1,3-di-o-tolylguanidine: 10 parts by weight
- Aqueous dispersion of 20% calcium carbonate: 12 parts by weight
- Polyvinyl acetate emulsion (solid content 40%): 5 parts by weight The coated paper was further coated with a paint of the following composition by means of a wire bar and dried at 60° C. The amount of the dry coating was 3 g/m$^2$.

Aqueous dispersion of 20%

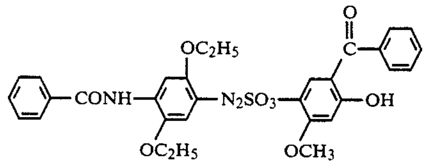

10 parts by weight

- Aqueous dispersion of 20% 2-hydroxy-3-naphtho-o-toluidide: 16 parts by weight
- Aqueous dispersion of 15% finely powdered silica: 24 parts by weight
- Aqueous solution of 10% PVA: 22 parts by weight The resulting photo-fixing heat-sensitive recording medium was pressed against a hot plate having a predetermined temperature under a pressure of 400 g/cm$^2$ for 5 seconds to develop a color, with the result that a dark bluish purple color was developed. The maximum optical density was found to be 1.28. When a temperature at which a density corresponding to ½ of the maximum optical density is given is determined as a color-forming temperature, it was found to be 94° C. Moreover, when recording was effected using a thermal head under printing conditions of an application voltage of 16 V and a pulse width of 3.0 ms, a recording density of 0.96 was obtained. Thereafter, the thus treated photo-fixing heat-sensitive recording media were allowed to stand under the room light for about 1 hour or were exposed to an UV lamp for about 10 seconds. As the result of the fixation, non-recorded portions became almost white and did not form a color when heated again. On the other hand, when the non-recorded photo-fixing media were allowed to stand at 20° C. at a relative humidity of 60% under light-shielding conditions for 6 months or at 40° C. at a relative humidity of 90% under light-shielding conditions for 24 hours to determine its storage stability, little fogging was observed. In addition, the recording characteristics did not lower after the storage. The characteristics of the recording media are summarized in Table 1. The characteristics obtained in Examples appearing hereinafter will also be shown in Table 1.

EXAMPLE 2

A paint having the following composition was prepared and applied onto a high quality paper of a weight basis of 64 g/m$^2$ by means of a wire bar and dried at 80° C. The amount of the coating on the dry basis was found to be 3.5 g/m$^2$.

- Aqueous dispersion of 20% 2-hydroxy-3-naphthoic acid morpholinopropylamide: 5 parts by weight
- Aqueous dispersion of 20% aluminium hydroxide: 8 parts by weight
- Polyvinyl acetate emulsion (solid content 40%): 4 parts by weight The thus coated paper was further coated with a paint of the following composition by means of a wire bar and dried at 60° C. The dry weight of the coating was 2.5 g/m$^2$.

- Aqueous dispersion of 20% 4-p-methoxybenzamido-2,5-diethoxybenzene diazonium hexafluorophosphate: 6 parts by weight
- Aqueous dispersion of 15% finely powdered silica: 15 parts by weight
- Aqueous solution of 10% PVA: 11 parts by weight
- Aqueous dispersion of 20% stearic acid amide: 4 parts by weight

EXAMPLE 3

A paint of the following composition was prepared and applied onto a high quality paper of a weight basis of 64 g/m$^2$ by means of a wire bar and dried at 80° C. The amount of the dry coating was found to be 4.0 g/m$^2$.

- 2-hydroxy-3-naphthoic acid morpholinopropylamide: 2 parts by weight
- Aluminium hydroxide: 3 parts by weight
- Polyvinyl acetate: 3 parts by weight
- MEK: 50 parts by weight Onto the thus coated paper was further applied a diazonium salt dispersed paint of the same type as used in Example 2 in the same manner as in Example 2.

The resulting photo-fixing heat-sensitive recording media had similar color-forming characteristics to those of Example 2 with excellent storage stability.

EXAMPLE 4

A paint of the following composition was prepared and applied onto a high quality paper of a weight basis of 64 g/m$^2$ by means of a wire bar and dried at 55° C. The amount of the coating was 5.7 g/m$^2$.

Aqueous dispersion of 20% 4-benzamido-2,5-diethoxybenzene diazonium tetra-p-tolylborate: 5 parts by weight Aqueous dispersion of 20% 2-hydroxy-3-naphtho-o-toluidide: 8 parts by weight Aqueous dispersion of 20% 1,2,3-triphenylguanidine: 7 parts by weight Aqueous dispersion of 15% finely powered silica: 16 parts by weight Aqueous solution of 10% PVA: 15 parts by weight

EXAMPLE 5

A paint of the following composition was prepared and applied onto a high quality paper of a weight basis of 64 g/m$^2$ by means of a wire bar and dried at 55° C. The amount of the dry paint was 5.0 g/m$^2$.

Aqueous dispersion of 20% 4-morpholino-2,5-dibutoxy benzene diazonium tetra-p-tolylborate: 4 parts by weight Aqueous dispersion of 20% 2-hydroxy-3-naphthoic acid diethyl aminoethyl amide: 6 parts by weight Aqueous dispersion of 15% finely powdered silica: 9 parts by weidht Aqueous solution of 10% PVA: 9 parts by weight

EXAMPLE 6

A paint of the following composition was prepared and applied onto a high quality paper of a weight basis of 64 g/m$^2$ by means of a wire bar and dried at 80° C. The amount of the dry paint was 4.0 g/m$^2$.

2-hydroxy-3-naphthoanilide: 3 parts by weight 1,3-di-o-tolylguanidine: 2 parts by weight Finely powdered silica: 3 parts by weight Polyvinyl butyral: 3 parts by weight Methanol: 50 parts by weight Onto the coated paper was further applied a paint of the following composition by means of a wire bar and dried at 60° C. The dry amount of the coating was 2.5 g/m$^2$.

Aqueous dispersion of 20% 4-p-methoxybenzamido-2,5-diethoxybenzene diazonium hexafluorophosphate: 5 parts by weight Aqueous solution of 20% sodium tetraphenylborate: 2 parts by weight Aqueous dispersion of 15% finely powdered silica: 6 parts by weight Aqueous solution of 10% PVA: 7 parts by weight

EXAMPLE 7

A paint of the following composition was prepared and applied onto a high quality paper of a weight basis of 64 g/m$^2$ by means of a wire bar and dried at 55° C. The amount of the dry paint was 5.5 g/m$^2$.

Aqueous dispersion of 20% 4-p-methoxybenzamido-2,5-diethoxybenzene diazonium hexafluorophosphate: 5 parts by weight Aqueous dispersion of 20% 2-hydroxy-3-naphthoanilide: 7 parts by weight Aqueous dispersion of 20% 1,3-di-o-tolylguanidine: 7 parts by weight Aqueous dispersion of 20% sodium tetraphenylborate: 1 parts by weight Aqueous dispersion of finely powdered silica: 8 parts by weight Aqueous solution of 10% PVA: 12 parts by weight

EXAMPLE 8

A paint of the following composition was prepared and applied onto a high quality paper of a weight basis of 64 g/m$^2$ and dried at 55° C. The amount of the dry paint was found to be 5.0 g/m$^2$.

Aqueous dispersion of 20% 4-morpholino-2,5-dibutoxybenzene diazonium tetraphenylborate: 4 parts by weight Aqueous dispersion of 20% 2-hydroxy-3-naphthoic acid morpholinopropylamide: 6 parts by weight Aqueous solution of 20% sodium tetra-p-fluorophenylborate: 1 part by weight Aqueous dispersion of 15% finely powdered silica: 8 parts by weight Aqueous solution of 15% PVA: 7 parts by weight As described hereinbefore, the photo-fixing heat-sensitive recording media according to the invention have high heat sensitivity and excellent storage stability and are very practically useful recording media.

TABLE

Various Characteristics of Recording Media obtained in Examples

| | Color development on Hot plate | | | Storage Stability Density of |
|---|---|---|---|---|
| Example No. | Color-developed temperature (°C.) | Maximal Density | Thermal Head Recording Density | Background After Storage at 40° C. and 90% R.H. for 24 hrs. |
| 1 | 94 | 1.28 | 0.96 | 0.20 |
| 2 | 84 | 1.30 | 1.02 | 0.19 |
| 3 | 83 | 1.30 | 1.03 | 0.16 |
| 4 | 90 | 1.32 | 1.07 | 0.23 |
| 5 | 83 | 1.25 | 1.00 | 0.21 |
| 6 | 91 | 1.30 | 0.97 | 0.10 |
| 7 | 89 | 1.35 | 1.10 | 0.13 |
| 8 | 84 | 1.40 | 1.15 | 0.11 |

The densities were all determined by the Macbeth densitometer (RD-514) using a visual filter by which non-fixed media were measured.

What is claimed is:

1. Photo-fixing heat-sensitive recording media which comprises a substrate and a coating layer of a recording composition formed on said substrate, said recording composition comprising at least one photosensitive diazonium salt and at least one coupler, both insoluble or sparingly soluble in water, and an organic boron salt capable of rendering the diazonium salt insoluble or sparingly soluble in water and represented by the formula

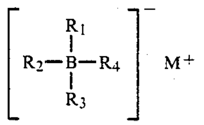

in which $R_1$–$R_4$ independently represent an alkyl group, an alkenyl group, a cycloalkyl group, an allyl group, an aryl group, a heterocyclic group or a cyano group, $M^+$ represents an alkali metal ion, at least one of the diazonium salt and the coupler being present in the form of a fine powder, said at least one diazonium salt, said at least one coupler and said organic boron salt being present in amounts sufficient for thermal recording of high sensitiveity with excellent storage stability even under high humidity conditions, said at least one diazonium salt, said at least one coupler and said organic boron salt being in admixture in a single layer or by reason of being in adjacent layers.

2. Photo-fixing heat-sensitive recording media according to claim 13, wherein an anion of the at least one diazonium salt is a member selected from the group consisting of $PF_6^-$, $BF_4^-$, an arylsulfonate ion and an organic boron anion represented by the following formula

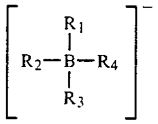

in which $R_1$-$R_4$ independently represent an alkyl group, an alkenyl group, a cycloalkyl group, an allyl group, an aryl group, a heterocyclic group or a cyano group.

* * * * *

UNITED STATES PATENT AND TRADEMARK OFFICE

CERTIFICATE OF CORRECTION

PATENT NO. : 4,511,642

DATED : April 16, 1985

INVENTOR(S) : KENSAKU HIGASHI ET AL.

It is certified that error appears in the above—identified patent and that said Letters Patent is hereby corrected as shown below:

Claim 2, line 2, "13" should be --1--.

Signed and Sealed this

*Thirtieth* Day of *July 1985*

[SEAL]

*Attest:*

DONALD J. QUIGG

*Attesting Officer* *Acting Commissioner of Patents and Trademarks*